(No Model.)

F. FONTNEAU.
FASTENING FOR CIRCULAR TENON JOINTS.

No. 539,015. Patented May 7, 1895.

WITNESSES:
Harry J. Garceau.
James W. Bennum

INVENTOR:
Frank Fontneau.
By S. Schofield
ATT'Y.

UNITED STATES PATENT OFFICE.

FRANK FONTNEAU, OF ATTLEBOROUGH, MASSACHUSETTS, ASSIGNOR TO HIMSELF AND THOMAS H. ANNABLE, OF SAME PLACE.

FASTENING FOR CIRCULAR TENON-JOINTS.

SPECIFICATION forming part of Letters Patent No. 539,015, dated May 7, 1895.

Application filed July 21, 1894. Serial No. 518,247. (No model.)

*To all whom it may concern:*

Be it known that I, FRANK FONTNEAU, a citizen of the United States, residing at Attleborough, in the county of Bristol and State of Massachusetts, have invented a new and useful Improvement in Fastenings for Circular Tenon-Joints, of which the following is a specification.

In furniture put together by means of circular tenon joints, especially in chairs, there is great liability of the joints becoming loose, so that the previously connected parts will be liable to complete separation from each other; and it is the object of my invention to prevent such separation; and my invention consists in the employment of a spring-ring which is held in a circular groove on the tenon, and enters a corresponding circular groove in the mortise which receives the tenon, as hereinafter fully set forth.

Figure 1:
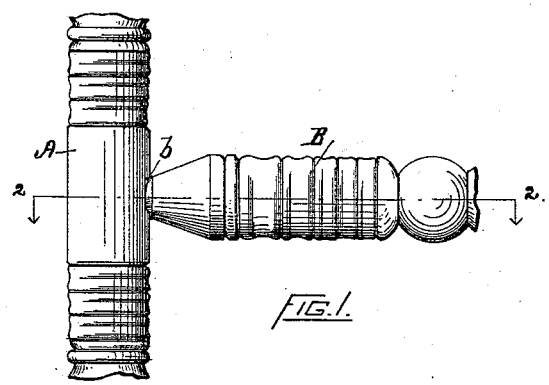
Figure 2:
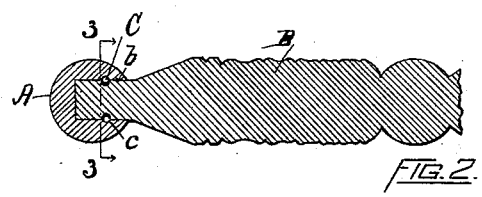
Figure 4:
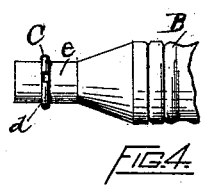
Figure 3:
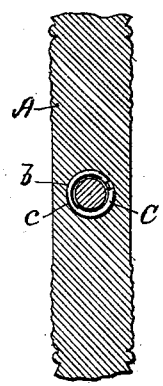
Figure 5:

Figure 1 represents a side view of a circular tenon-joint, as in an article of furniture. Fig. 2 represents a section taken on the line 2 2 of Fig. 1. Fig. 3 represents a section taken on the line 3 3 of Fig. 2. Fig. 4 represents a side view of the tenon and spring-ring. Fig. 5 represents a separate side view of the spring-ring.

In the drawings, A represents a turned stick which may form a part of a piece of furniture, the said stick being provided with a circular mortise $b$, having the annular groove $c$, which corresponds in relative position with the annular groove $d$ on the tenon $e$ of the turned stick B.

Within the groove $d$ of the tenon $e$, is placed the open spring-ring C, which prior to its entrance into the circular mortise $b$ springs outward to a greater diameter than that of the tenon $e$, so that when forced into the mortise $b$ with the tenon $e$, the said spring-ring will, after its initial compression at the outer end of the mortise, expand into the annular groove $c$, so that while the outer half of the material of the ring is expanded into the groove $c$, the inner half of the same will lie in the groove $d$ of the tenon, thus serving to firmly lock the two parts A and B together, even when no glue or other fastening is employed, so that the parts cannot be separated in use; and this improvement constitutes a desirable fastening for the joints of articles of furniture, or for the circular tenon joints of various implements, and other articles.

I claim as my invention—

The combination with the part provided with the mortise and the annular groove, of the tenon provided with the corresponding annular groove, and the expansible ring held in the annular groove of the tenon, and adapted to spring into the annular groove of the mortise and lock the parts together, substantially as described.

FRANK FONTNEAU.

Witnesses:
SOCRATES SCHOLFIELD,
HARRY J. GARCEAU.